US012679176B2

(12) United States Patent
Kirch et al.

(10) Patent No.: US 12,679,176 B2
(45) Date of Patent: Jul. 14, 2026

(54) AIR VENT WITH ADJUSTABLE AIR OUTLET DIRECTION

(71) Applicant: Weber GmbH & Co. KG, Dillenburg (DE)

(72) Inventors: Volker Kirch, Steffenberg (DE); Andreas Beck, Waldbrunn (DE)

(73) Assignee: Weber GmbH & Co. KG, Dillenburg (DE)

( * ) Notice: Subject to any disclaimer, the term of this patent is extended or adjusted under 35 U.S.C. 154(b) by 386 days.

(21) Appl. No.: 18/505,236

(22) Filed: Nov. 9, 2023

(65) Prior Publication Data
US 2024/0174056 A1 May 30, 2024

(30) Foreign Application Priority Data

Feb. 16, 2023 (DE) .......................... 102023103899.0

(51) Int. Cl.
B60H 1/34 (2006.01)

(52) U.S. Cl.
CPC ... B60H 1/3421 (2013.01); B60H 2001/3471 (2013.01)

(58) Field of Classification Search
CPC .......... B60H 1/3421; B60H 2001/3471; B60H 2001/3478
See application file for complete search history.

(56) References Cited

U.S. PATENT DOCUMENTS

| | | | | |
|---|---|---|---|---|
| 5,052,282 A * | 10/1991 | Scharamm | ......... | B60H 1/00857 454/145 |
| 6,652,371 B2 * | 11/2003 | Kamio | ................... | B60H 1/345 454/155 |
| 9,370,986 B2 | 6/2016 | Londiche | | |
| 11,225,126 B2 | 1/2022 | Lee et al. | | |
| 11,679,645 B2 | 6/2023 | Schaal | | |
| 2022/0145970 A1 | 5/2022 | Groben | | |

FOREIGN PATENT DOCUMENTS

| | | | | |
|---|---|---|---|---|
| DE | 10231580 A1 * | 2/2004 | .......... | B60H 1/3421 |
| DE | 102014203511 B3 | 4/2015 | | |
| DE | 102015101101 B3 | 7/2016 | | |
| DE | 102015101254 B3 | 7/2016 | | |
| DE | 102018005002 A1 | 12/2019 | | |
| DE | 102018220352 A1 | 2/2020 | | |
| DE | 102020101678 A1 | 7/2021 | | |

(Continued)

*Primary Examiner* — Allen R. B. Schult
(74) *Attorney, Agent, or Firm* — Rogowski Law LLC

(57) ABSTRACT

An air vent (10) with an adjustable air exit direction (9) has at least one first blade (5) that is pivotable about a first pivot axis (4) for guiding the air flow (15) and at least one second blade (7) that is pivotable about a second pivot axis (6) that extends obliquely or vertically to the first pivot axis (4). For the common displacement of the blades (5, 7), a single electromotive or manual drive (8) and a coupling device (12) are provided. The coupling device (12) has a slide link (14) operatively connected to the drive (8) and slidably mounted relative to the flow channel (1) of the air vent (10). A first control cam (16) sets different positions of the first blades (5) and a second control cam (17) sets different positions of the second blades (7). The control cams (16, 17) are configured on different sides (22, 23) of the slide link (14).

16 Claims, 4 Drawing Sheets

(56) References Cited

FOREIGN PATENT DOCUMENTS

| | | | |
|---|---|---|---|
| DE | 102021119416 | A1 | 3/2022 |
| DE | 102021106582 | A1 | 9/2022 |
| EP | 3192684 | A1 | 7/2017 |
| EP | 3628891 | A1 | 4/2020 |
| KR | 1020070034793 | A1 | 3/2007 |
| WO | 2020172098 | A1 | 8/2020 |

* cited by examiner

AIR VENT WITH ADJUSTABLE AIR OUTLET DIRECTION

BACKGROUND OF THE INVENTION

The invention relates to an air vent, also called a fresh air grill, with an adjustable air exit direction.

Air vents can be used, for example, in vehicles, in particular motor vehicles, and generally serve to regulate the air flow that flows out of an air exit opening in the horizontal and/or vertical direction. The air vent can be arranged, for example, in the instrument panel of a motor vehicle.

It is conceivable to use such air vents not only in the vehicle sector but also in fans, air conditioning systems, for example in buildings or other areas where the air flow can be specifically adjusted.

Various apparatuses and methods for adjusting an air flow are known from the prior art. In known air vents, vertically and horizontally aligned air guiding elements or blades can be arranged one behind the other. As a rule, both the horizontally extending blades as well as the vertically extending blades can be pivoted separately or together via a displacement mechanism in order to adjust the direction of the outflowing air.

From DE 10 2021 119 416 A1, a control mechanism for a kinematics in the vehicle interior is known. The control mechanism has a base body, a control link, and at least two output elements. A sliding block element with two degrees of freedom relative to the base body is guided through the control link by alternating movements in two opposing directions of the first degree of freedom and comes into contact with the first and/or the second output element one after the other. In order to implement such a control mechanism as simply as possible, it is proposed that rotational movements are used instead of translational movements.

DE 10 2021 106 582 A1 describes a drive device for independently controlling at least two apparatuses by means of a single drive unit, comprising at least a drive unit, a first transmission unit, at least a first guide element, and a first stationary control element, which comprises a first link arrangement with a switching link. The at least one first guide element can be displaced via the first transmission unit by the drive unit within the switching link of the first link arrangement, wherein at least one guide track is provided in the switching link for each apparatus to be controlled, in which at least one second guide element is arranged. The second guide elements are connected to first transmission elements rotatably mounted on the first stationary control element, which can be set into rotation via the second guide elements in accordance with the displacement of the at least one first guide element, wherein the first transmission elements are connected or connectable to the respective apparatus assigned thereto.

For example, an air vent for a motor vehicle is also known from DE 10 2018 005 002 A1.

DE 10 2015 101 254 A1 relates to a drive device for displacing at least two apparatuses.

From DE 10 2020 101 678 A1, an adjustment device for changing a mass flow in a motor vehicle is known.

The disadvantage of the well-known air vents is the complex structure with the effort-intensive kinematics.

Based on the disadvantages described above, the invention addresses the problem of specifying an improved air vent that has a simple structure and a particularly comfortable pivoting of the blades in as easy, space-saving, and cost-effective a manner as possible.

SUMMARY OF THE INVENTION

The invention relates to an air vent with an adjustable air exit direction, with a flow channel arranged in a housing and having an air entry opening and an air exit opening substantially opposite to the air entry opening.

The air vent is also referred to as a nozzle or air nozzle, wherein the flow channel does not necessarily need to have the shape of a classic nozzle with a narrowing flow cross-section. In particular, in the installed position of the air vent, it is possible to deflect the air jet both in the vertical direction and in the horizontal direction using exactly one single actuator.

An air flow can flow into the flow channel through the air entry opening and out through the air exit opening.

Furthermore, at least one first blade, for example a horizontal blade, which can be pivoted about a first pivot axis relative to the flow channel, is provided for guiding the air flow and at least one second blade, for example a vertical blade, is provided, which can be pivoted relative to the flow channel, whose second pivot axis extends obliquely or vertically relative to the first pivot axis.

This is understood to mean, in particular, that the first pivot axis extends vertically to an imaginary or virtual plane, wherein the second pivot axis extends obliquely or parallel to the plane or lies in the plane.

The at least one first blade is pivotable, for example, in a first pivot range between two end positions delimiting the pivot range. The at least one second blade is also pivotable, for example, in a second pivot range about the second pivot axis relative to the flow channel between two end positions.

For the independent displacement of the blades, a single and in particular electromotive or manual drive and a coupling device are provided. The drive can preferably be designed as an electrical actuator or as an electrically operable actuator, for example as an electric motor. Alternatively, it can also be designed as a manually operated knurling wheel, a lever, a sliding lever, a pull rod, or a toothed rack.

In other words, both the at least one first blade and the at least one second blade can be pivoted about the respective pivot axes by means of the drive, and thus for example electrically or electromotively or even manually, so that the blades, which are preferably designed to be inherently rigid or dimensionally stable, can be displaced i.e., pivoted particularly comfortably and in particular automatically, for example by means of a regulation or control system.

Because the first blade and the second blade or the rows of blades can be driven by means of the drive via the coupling device and are thereby pivotable, and because the blades can be pivoted relative to one another by means of the drive via the coupling device, different air exit directions can be set, into which the air can flow out of the flow channel and, for example, into the interior of the motor vehicle or into a building.

According to the invention, the coupling device has a slide link operatively connected to the drive and slidably mounted relative to the housing of the air vent, with a first control cam for setting different positions of the first blades and with a second control cam for setting different positions of the second blades, wherein the control cams are configured on different sides or surfaces of the slide link. Due to the large curve length of the control cams, a finer adjustment of the air outlet opening is possible. It is conceivable that the drive acts directly on the slide link.

The expression "different sides of the slide link" means that the control cams are located on different surfaces of the slide link.

It is conceivable, for example, that the control cams are arranged on opposite sides or surfaces of a substantially plate-shaped slide link. The term "plate-shaped" is understood to mean that the slide link substantially extends in two dimensions.

Alternatively, the side of the slide link with the first control cam for setting different positions of the first blades can be configured obliquely, in particular substantially vertically, to the side of the slide link with the second control cam for setting different positions of the second blades.

In particular, the slide link can be substantially L-shaped. It is also conceivable that a side or surface with one of the control cams is arranged substantially vertically to the side with a different control cam, without the shape of the slide link being L-shaped. In both of these variants, the side of the slide link with the first control cam is aligned substantially vertically to the side of the slide link with the second control cam. This special design variant allows design space in the air vent to be optimized. This is because slide link not only substantially extends in two dimensions, but also extends into a further plane in order to make optimal use of the design space there.

The various sides or surfaces for the control cams can be formed integrally.

The air flow that flows out of the air vent, in particular from the flow channel, is directed or deflected or discharged particularly advantageously, and in particular as needed, by means of the blades. The air vent according to the invention enables the realization of a nozzle kinematics, which has a particularly simple and thus space-saving and cost-effective structure and at the same time enables a particularly advantageous deflection of the air flow that flows out of the air vent.

In this way, an effective and targeted control of the air flow is achieved with just a few components. This also means that certain positions of the blades can be maintained precisely.

According to a further advantageous embodiment of the invention, the first control arm coupled to the first blades has a first guide pin, which is displaced in the first control cam for pivoting the first blades about the first pivot axis relative to the flow channel.

Alternatively or additionally, it can be provided that a second control arm coupled to the second blades has a second guide pin which can be displaced in the second control cam for pivoting the second blades about the second pivot axis relative to the flow channel, wherein, when the slide link is displaced by the drive, the guide pins coupled to the control arms are displaced in the respective control cams in such a way that both the first and the second blades can be displaced independently of one another by means of a single drive.

The first and second blades are each mechanically coupled to the single drive via the coupling device, however, due to the shape of the control cams, it is possible for the first and second blades to be displaced independently of one another. For example, the first blade can be pivoted while the second blade remains in one position. This can be achieved by a so-called free travel in the control cam, in which the position of the blade does not change.

In this way, a simple mechanical coupling of the blades with the corresponding control arms and the respective control cam is achieved. The guide pins are displaced in the two control cams when the cam disk moves or rotates, so that the control arms coupled to the guide pins are also moved accordingly. Consequently, the blades coupled to the control arms are also moved in accordance with the displacement of the guide pins in the control cams. The control cams simultaneously and independently actuate the first and second blades in a determined or specified relationship.

In order to realize a particularly simple and precise displacement, according to one advantageous further development of the invention, at least one of the control arms is pivotally mounted by means of a bearing, so that when the corresponding guide pin is displaced in the respective control cam, the control arm and the blades coupled thereto are pivoted. In this way, the displacement of the guide pins in the control cams, and thus the movement of the control arms, is implemented particularly efficiently and safely. The bearing can be provided on a housing part of the air vent that receives the blades, so that the control arm (and the blades) are designed to be pivotable relative to this housing part.

In a particularly advantageous embodiment of the invention, it is provided that one of the first or second blades can be pivoted about its pivot axis relative to the flow channel and relative to the other blade by means of the slide link driven by the drive, while a pivoting of the other blade about its pivot axis relative to the flow channel and caused by the drive is omitted.

This is understood in particular to mean that, for example, the first blade is pivotable or pivoted by means of the drive about the first pivot axis relative to the flow channel, while a pivoting of the second blade around the flow channel, being caused by the drive and occurring about the second pivot axis, is omitted.

Alternatively or additionally, it is conceivable that the second blade is pivotable or pivoted by means of the drive about the second pivot axis relative to the flow channel, while a pivoting of the first blade, being caused by the drive and occurring about the first pivot axis, is omitted.

As a result, the air flow can be directed or guided or deflected particularly advantageously by means of the blades, although the blades are or can be coupled via the coupling device to the precisely one drive that is common to the blades.

Because both the at least one first blade and the at least one second blade can be pivoted using the precisely one drive that is common to the blades, the number of parts, the design space requirement, the weight, and the costs of the air vent can be kept at a particularly low level.

Of course, within the meaning of the invention, it is also conceivable that the blades can be pivoted together or simultaneously about the pivot axes relative to the flow channel, for example by means of the drive, via the coupling device.

According to one advantageous variant of the invention, at least one of the control arms has a flexibly configured end which is coupled to a tappet provided on the blades and can in particular be stuck onto the tappet.

It has been shown to be particularly advantageous that the flexible end has clamping regions for receiving the tappet, which, in the assembly position, are biased against one another by means of a spring element.

The spring element causes a spring-loaded coupling of the control arm to the blades. In this way, in the event of an unwanted manual intervention directly into the blades due to improper use, for example a manual displacement of the blades by a user, i.e., by touching and moving the blades, it can be prevented that the kinematics and the drive are destroyed or damaged. The same is true for the insertion or removal of fragrance containers or smartphone holders or the like into the blades of the air vent. Here too, due to the resilient coupling of the control arm to the blades, play is ensured without damaging or destroying the kinematics.

Due to the spring-loaded coupling, the blades can be moved manually to a certain extent in the case of improper use. However, damage to the control arms, the guide pins, or the control cams, and the drive can be prevented due to the spring coupling.

According to an advantageous variant of the invention, it can be provided that an output shaft of the drive acts on an output gear, which engages with a toothing on the slidably mounted slide link for moving the shift link [sic: slide link] in order to displace the blades.

An embodiment of the invention in which the toothing of the slide link is designed as a toothed rack for a rectilinear movement of the slide link is advantageous. It is conceivable that the slide link and the toothed rack are designed integrally.

The slide link can be made of plastic, in particular of slidable plastic, or metal.

According to an advantageous development of the invention, a plurality of first blades and/or a plurality of second blades are coupled to one another respectively for synchronous movement.

The at least one first blade belongs, for example, to a first row of blades, which can comprise the first blade as well as further blades or at least one further blade. The blades of the first row of blades are, for example, arranged sequentially or one after the other along an in particular straight first direction, wherein the previous and following designs for the first blade can also be readily transferred to the other, further blades of the first row of blades and vice versa.

Alternatively or additionally, the at least one second blade can belong to a second row of blades, which can comprise the second blade and a plurality of further blades or at least one further blade. The blades of the second row of blades are, for example, arranged sequentially or one after the other along a second direction, which extends obliquely or vertically to the first direction and in particular straight, wherein the previous and following designs for the second blade can also be readily transferred to the other, further blades of the second row of blades and vice versa.

In a particularly advantageous embodiment of the invention, the slide link is arranged above or below the air vent in the assembled state; in particular, the slide link and the drive can be arranged in a common housing, which further simplifies the structure of the air vent.

Further objectives, advantages, features, and applications of the present invention are derived from the subsequent description of an embodiment by way of the drawings. All described and/or depicted features, per se or in any combination, constitute the subject-matter of the present invention, regardless of their summary in the patent claims or their back-reference.

Figure 1:
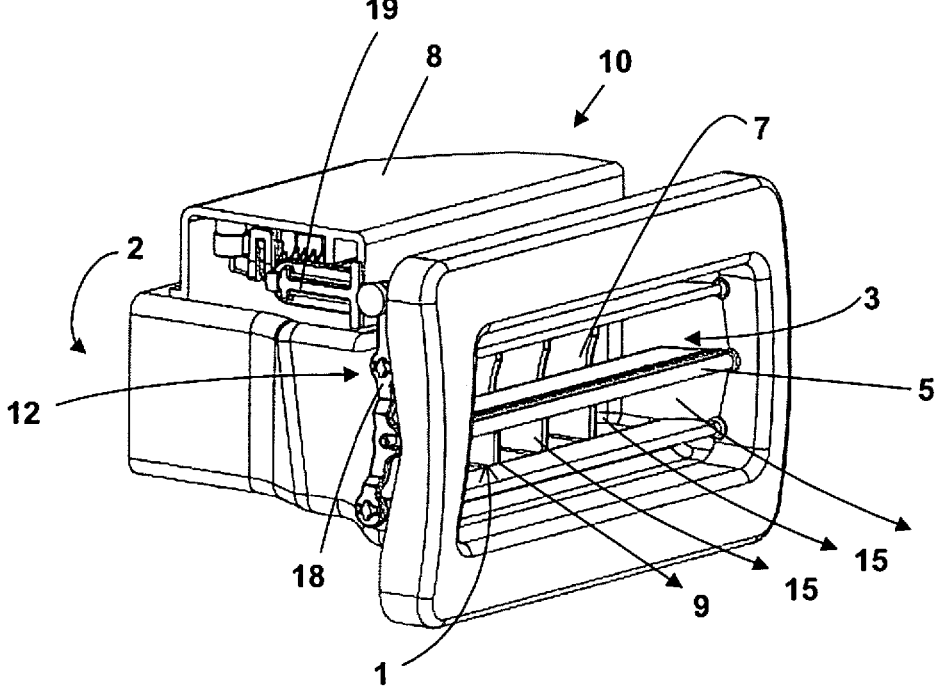
FIG. 1 an air vent with an adjustable air exit direction with a slide link in a perspective view, FIG. 2 the air vent according to FIG. 1 in a further perspective view, FIG. 3 a detail view of the air vent according to FIG. 2, and FIG. 4 a further detail view of the air vent.

Identical or identically functioning components are provided with reference numerals based on an embodiment in the subsequently depicted figures of the illustration in order to improve readability.

DETAILED DESCRIPTION

FIG. 1 shows an air vent 10 with an adjustable air exit direction 9 in a perspective view. A flow channel 1 can further be seen, which is arranged in a housing of the air vent. The flow channel 1 has an air entry opening 2 and an air exit opening 3 substantially opposite to the air entry opening 2.

Figure 2:
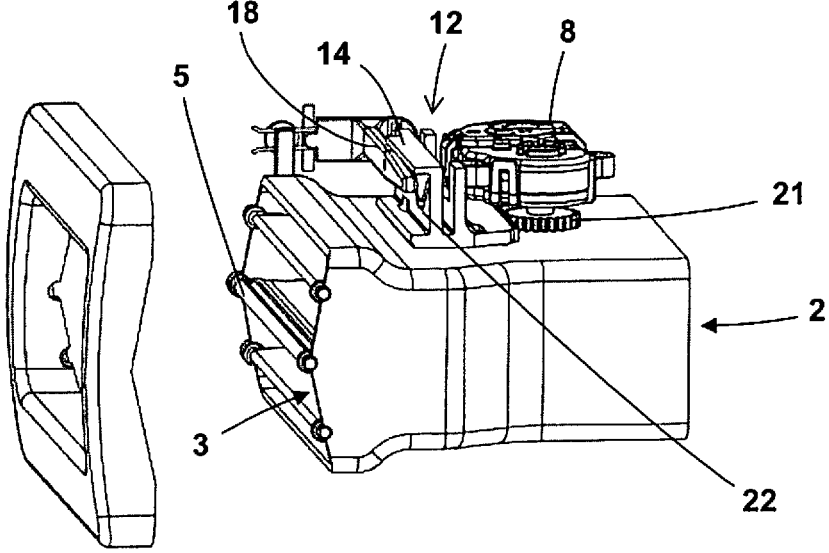

FIG. 2 shows the air vent 10 according to FIG. 1 in a further perspective view, wherein an obscured drive housing and a dismounted front panel are shown for better clarity.

Figure 3:
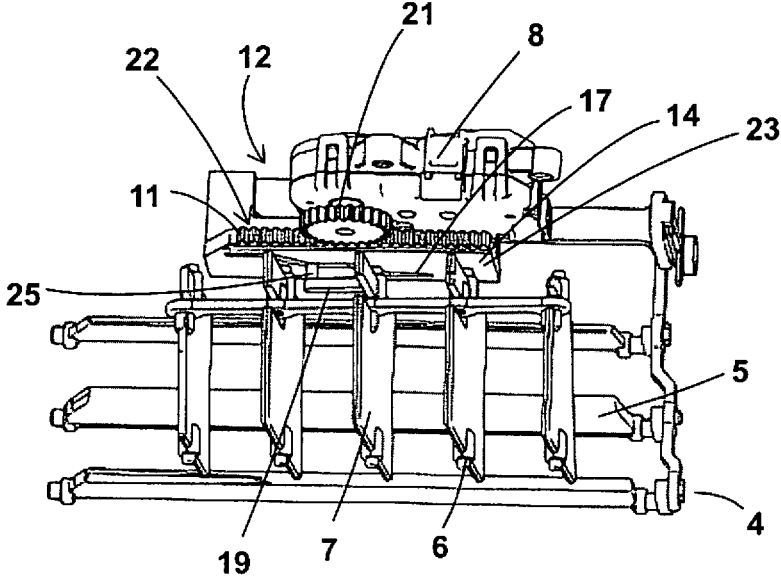
Figure 4:
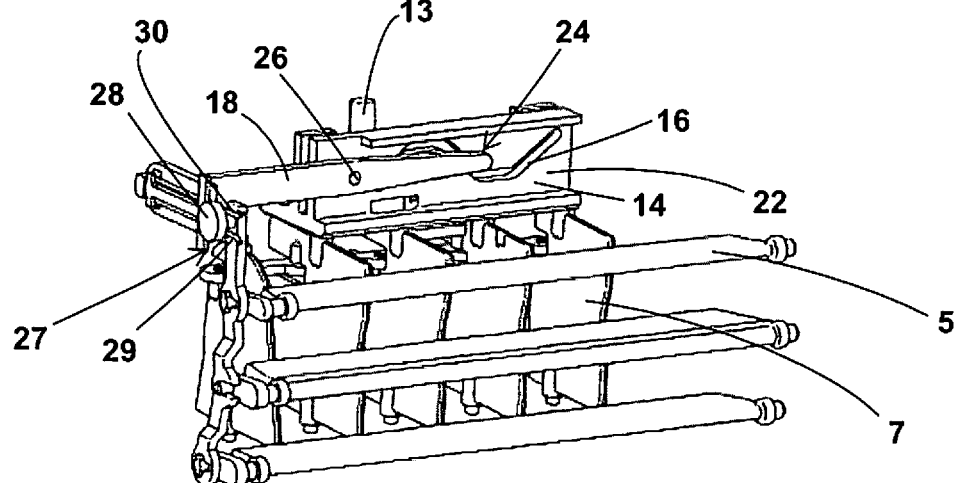

FIGS. 3 and 4 show detailed views of the air vent.

An air flow 15 flows into the flow channel 1 through the air entry opening 2 and out through the air exit opening 3 (cf. FIG. 2).

FIG. 1 also shows a plurality of first blades 5 that can be pivoted about a first pivot axis 4 relative to the flow channel 1 for guiding the air flow 15. These blades 5 can also be referred to as horizontal blades.

In particular in FIG. 3, a plurality of second blades 7 that can be pivoted relative to the flow channel 1 can also be seen, whose second pivot axis 6 in the present case extends approximately vertically to the first pivot axis 4 of the first blades 5. These blades 7 can be referred to as vertical blades in the present exemplary embodiment. In other words, the first pivot axis 4 extends vertically to an imaginary or virtual plane, wherein the second pivot axis 6 extends approximately parallel to the plane or lies in the plane.

In the present exemplary embodiment according to FIGS. 1 to 4, a plurality of first blades 5 and/or a plurality of second blades 7 are coupled to one another for a respective synchronous movement.

The first blades 5 are, for example, pivotable in a first pivot range between two end positions delimiting the pivot range. The second blades 7 are also pivotable, for example, in a second pivot range about the second pivot axis 6 relative to the flow channel 1 between two end positions.

For the independent displacement of the blades 5, 7, a single and in the present case electromotive drive 8 or actuator and a coupling device 12 are provided in the present exemplary embodiment. However, a manual drive (not shown) is also conceivable, for example a manually operated knurling wheel, a lever, a sliding lever, a pull rod, or a toothed rack.

In this way, both the first blades 5 and the second blades 7 can be pivoted about the respective pivot axes 4, 6 by means of the drive 8, so that the blades 5, 7, which are preferably designed to be inherently rigid or dimensionally stable, can be pivoted particularly comfortably and in particular automatically, for example by means of a regulation or control system.

According to FIGS. 1-4, the coupling device 12 has a slidably mounted slide link 14 which is operatively connected to the drive 8 and has a first control cam 16 for setting different positions of the first blades 5. Furthermore, the slide link 14 has a second control cam 17 for setting different positions of the second blades 7. The slide link 14 can be made of plastic, in particular of slidable plastic, or metal.

As can be seen from FIGS. 1-4, the control cams 16, 17 are configured on different sides or surfaces of the slide link 14.

In one embodiment (not shown), the slide link 14 can be substantially plate-shaped, wherein the control cams 16, 17 are arranged on opposite sides 22, 23 of the substantially plate-shaped slide link 14.

The embodiments according to FIGS. 1-4 show a further variant. Here, the side 22 or surface of the slide link 14 with the first control cam 16 is aligned substantially vertically to the side 23 or surface of the slide link 14 with the second control cam 17. The slide link 14 can be substantially L-shaped. In the present case, the side or surface 22 with the first control cam 16 for the first (horizontal) blades 5 is aligned approximately vertically to the side 23 with the second control cam 17 for the second (vertical) blades 7. It is also conceivable that the respective control cams 16, 17 are swapped on the sides 22, 23.

Variants are also possible in which the side 22 of the slide link 14 with the first control cam 16 for setting different positions of the first blades 5 is configured obliquely to the side 23 of the slide link 14 with the second control cam 17. In other words, the sides or surfaces with the respective control cams 16, 17 can also be aligned at a different, arbitrary angle to one another.

As further shown by FIG. 1, an output shaft of the drive 8 acts on an output gear 21, which engages with a toothing 11 on the slidably mounted slide link 14 for moving the slide link 14 in order to displace the blades 5, 7. The toothing 11 of the slide link 14 is designed as a toothed rack on the slide link 14 for a rectilinear movement of the slide link 14. The slide link 14 and the toothing (toothed rack) 11 can be formed integrally.

In the present case, in the assembled state according to FIG. 4, the slide link 14 is arranged on top of a housing of the air vent 10. In the present case, the drive 8 acts directly on the drive shaft 13 of the slide link 14. The drive shaft 13 can then be inserted into a corresponding receptacle on the drive 8.

As can be seen in particular from FIG. 1, the first 5 and/or second blades 7 are coupled to a respective control arm 18, 19 for controlling the blades 5, 7. In one embodiment variant (not shown), at least one of the control arms 18, 19 can have a toothing between two levers of the control arm 18, 19, which can lead to a uniform transmission of force.

The first control arm 18 coupled to the first blades 5 in the present case has a first guide pin 24, which is displaced in the first control cam 16 for pivoting the first blades 5 about the first pivot axis 4 relative to the flow channel 1 (cf. FIG. 4).

In the selected exemplary embodiment, the second control arm 19 coupled to the second blades 7 has a second guide pin 25, which is displaced in the second control cam 17 for pivoting the second blades 7 about the second pivot axis 6 relative to the flow channel 1 (cf. FIG. 3)

When the slide link 14 is displaced by the drive 8 relative to a housing of the air vent 1, the guide pins 24, 25 coupled to the control arms 18, 19 are displaced in the respective control cams 16, 17 in such a way that both the first 5 and the second blades 7 are displaced independently of one another by means of a single drive 8.

In other words, a movement of the slide link 14 by the drive 8 causes the first and second blades 5, 7 to be displaced independently.

The first 5 and second blades 7 are each mechanically coupled to the single drive 8 via the coupling device 12, however, due to the shape of the control cams 16, 17, it is possible for the first 5 and second blades 7 to be displaced independently of one another. For example, the first blade 5 can be pivoted while the second blade 7 remains in one position. This can be achieved by a so-called free travel in the control cam, in which the position of the blade does not change.

As FIG. 4 further shows, in the present case, for the displacement of the first (horizontal) blades 5, the first control arm 18 is pivotally mounted by means of a bearing 26, so that when the corresponding guide pin 24 is displaced in the first control cam 16, the control arm 18 and the blades 5 coupled thereto are pivoted. It is also conceivable that the second control arm 19 or both control arms 18, 19 are pivotally mounted by means of a bearing 26.

The bearing 26 can be provided on a housing part of the air vent 1 that receives the blades 5, 7, so that the control arm 18, 19 (and the blades 5, 7) are designed to be pivotable relative to this housing part.

In particular, it is possible for one of the first or second blades 5, 7 to be pivoted about its pivot axis 4, 6 relative to the flow channel 1 and relative to the other blade 7, 5 by means of the slide link 14 driven by the drive 8, while a pivoting of the other blade 7, 5 about its pivot axis 6, 4 relative to the flow channel 1 and caused by the drive 8 is omitted.

The blades 5, 7 can thus be moved independently of one another into numerous positions in order to realize an air flow 15 in almost any desired direction. Different air exit directions can therefore be set, into which the air flow 15 can flow out of the flow channel 1 and, for example, into the interior of the motor vehicle or into a building.

Of course, within the meaning of the invention, it is also conceivable that the blades 5, 7 are pivoted together or simultaneously about the pivot axes 4, 6 relative to the flow channel 1, for example by means of the drive 8, via the coupling device 12.

In other words, a displacement of the slide link 14 by the drive 8 causes the first and second blades 5, 7 to be displaced independently. In this way, a wide range of setting options is ensured.

As can be seen in particular from FIG. 4, in the present case, the first control arm 18 has a flexibly configured end 27, which is coupled to a tappet 28 provided on the first (horizontal) blades 5. The end 27 can be stuck onto the tappet 28. However, it is also conceivable that the second control arm 19 or both control arms 18, 19 have such an end.

In particular, in the present design variant, it is provided that the flexible end 27 of the first control arm 18 has clamping regions 30 for receiving the tappet 28 of the first blades 5, which, in the assembly position, are biased against one another by means of a spring element 29.

This spring element 29 causes a spring-loaded coupling of the first control arm 18 to the first blades 5. In this way, in the event of an unwanted manual intervention directly into the blades due to improper use, for example a manual displacement of the blades by a user, i.e., by touching and moving the blades, it can be prevented that the kinematics and the drive are destroyed or damaged. This is because, due to the spring-loaded coupling, the blades can be moved manually to a certain extent in the case of improper use. However, damage to the control arm 18, the guide pin 24, or the control cam 16, and the drive 8 can be prevented due to the spring coupling.

As FIG. 1 makes clear, the slide link 14 can be arranged above (or below) the air vent 10 in the assembled state. In the present case, the slide link 14 and the drive 8 are arranged in a common housing, which further simplifies the structure of the air vent 10.

REFERENCE NUMERALS

1 Flow channel
2 Air entry opening

3 Air exit opening
4 First pivot axis
5 First blade (horizontal)
6 Second pivot axis
7 Second blade (vertical)
8 Drive
9 Air exit direction
10 Air vent
11 Toothing (slide link)
12 Coupling device
13 Drive shaft (cam disk)
14 Slide link
15 Air flow
16 First control cam (first blades)
17 Second control cam (second blades)
18 First control arm (first blades)
19 Second control arm (second blades)
21 Output gear
22 First side of slide link
23 Second side of slide link
24 First guide pin
25 Second guide pin
26 Bearing
27 Flexible end of control arm
28 Tappet for blades
29 Spring element
30 Clamping region

The invention claimed is:

1. An air vent with an adjustable air exit direction, comprising:

a flow channel arranged in a housing and having an air entry opening and an air exit opening substantially opposite to the air entry opening;

at least one first blade that is pivotable about a first pivot axis relative to the flow channel for guiding an air flow;

at least one second blade that is pivotable about a second pivot axis relative to the flow channel, wherein the second pivot axis extends obliquely or vertically to the first pivot axis;

a single electromotive or manual drive;

a coupling device having a slide link operatively connected to the drive and slidably mounted relative to the housing of the air vent, said coupling device having a first control cam for setting different positions of the first blades and a second control cam for setting different positions of the second blades, wherein the first control cam and the second control cam are configured on different sides of the slide link;

a first control arm coupled to the first blades, wherein said first control arm has a first guide pin configured to be displaced in the first control cam for pivoting the first blades about the first pivot axis relative to the flow channel;

a second control arm coupled to the second blades, wherein the second control arm has a second guide pin configured to be displaced in the second control cam for pivoting the second blades about the second pivot axis relative to the flow channel, and wherein, when the slide link is displaced by the drive, the first guide pin coupled to the first control arm and the second guide pin coupled to the second control arm are displaced in the respective first control cam and second control cam in such a way that both the first blades and the second blades can be displaced independently of one another by means of the single drive; and wherein at least one of the first control arm and second control arm is pivotally mounted by means of a bearing, so that when the corresponding first guide pin or second guide pin is displaced in the respective first control cam or second control cam, either the first control arm and the first blades coupled thereto are pivoted or the second control arm and the second blades coupled thereto are pivoted.

2. The air vent according to claim 1, wherein the first control cam and the second control cam are configured on opposite sides of the slide link, and wherein the slide link is substantially plate-shaped.

3. The air vent according to claim 1, wherein the side of the slide link with the first control cam for setting different positions of the first blades is configured obliquely or substantially vertically to the side of the slide link with the second control cam for setting different positions of the second blades.

4. The air vent according to claim 1, wherein the slide link is substantially L-shaped, and wherein the side of the slide link with the first control cam is aligned substantially vertically to the side of the slide link with the second control cam.

5. The air vent according to claim 1, wherein, by means of the slide link driven by the drive, one of the first blades or the second blades is pivotable about the respective first pivot axis or second pivot axis relative to the flow channel and relative to the other of the first blade or second blade, while the other of the first blade or second blade does not pivot about the respective first pivot axis or second pivot axis relative to the flow channel.

6. The air vent according to claim 1, wherein at least one of the first control arm and second control arm has a flexibly configured end that is coupled to a tappet provided on either the first blades or the second blades.

7. The air vent according to claim 6, wherein the flexibly configured end is stuck into the tappet.

8. The air vent according to claim 6, wherein the flexible end of the first control arm or the second control arm has clamping regions for receiving the tappet, which clamping regions are biased against one another by a spring element.

9. The air vent according to claim 1, wherein an output shaft of the drive acts on an output gear, and the output gear engages with a toothing on the slidably mounted slide link for displacing the slide link to adjust pivotal orientation of the first blades and/or of the second blades.

10. The air vent according to claim 9, wherein the toothing of the slide link is configured as a toothed rack for a rectilinear movement of the slide link.

11. The air vent according to claim 1, wherein the slide link is made of a material selected from the group consisting of plastic, slidable plastic, and metal.

12. The air vent according to claim 1, wherein a plurality of the first blades is coupled to one another for synchronous movement.

13. The air vent according to claim 1, wherein a plurality of the second blades is respectively coupled to one another for synchronous movement.

14. The air vent according to claim 12, wherein a plurality of the second blades is coupled to one another for synchronous movement.

15. The air vent according to claim 1, wherein the slide link is arranged above or below the air vent.

16. The air vent according to claim 1, wherein the slide link and the drive are arranged in a common housing.

* * * * *